Oct. 9, 1945.  J. C. GARAND  2,386,205
FIREARM
Filed Jan. 8, 1942  8 Sheets-Sheet 3
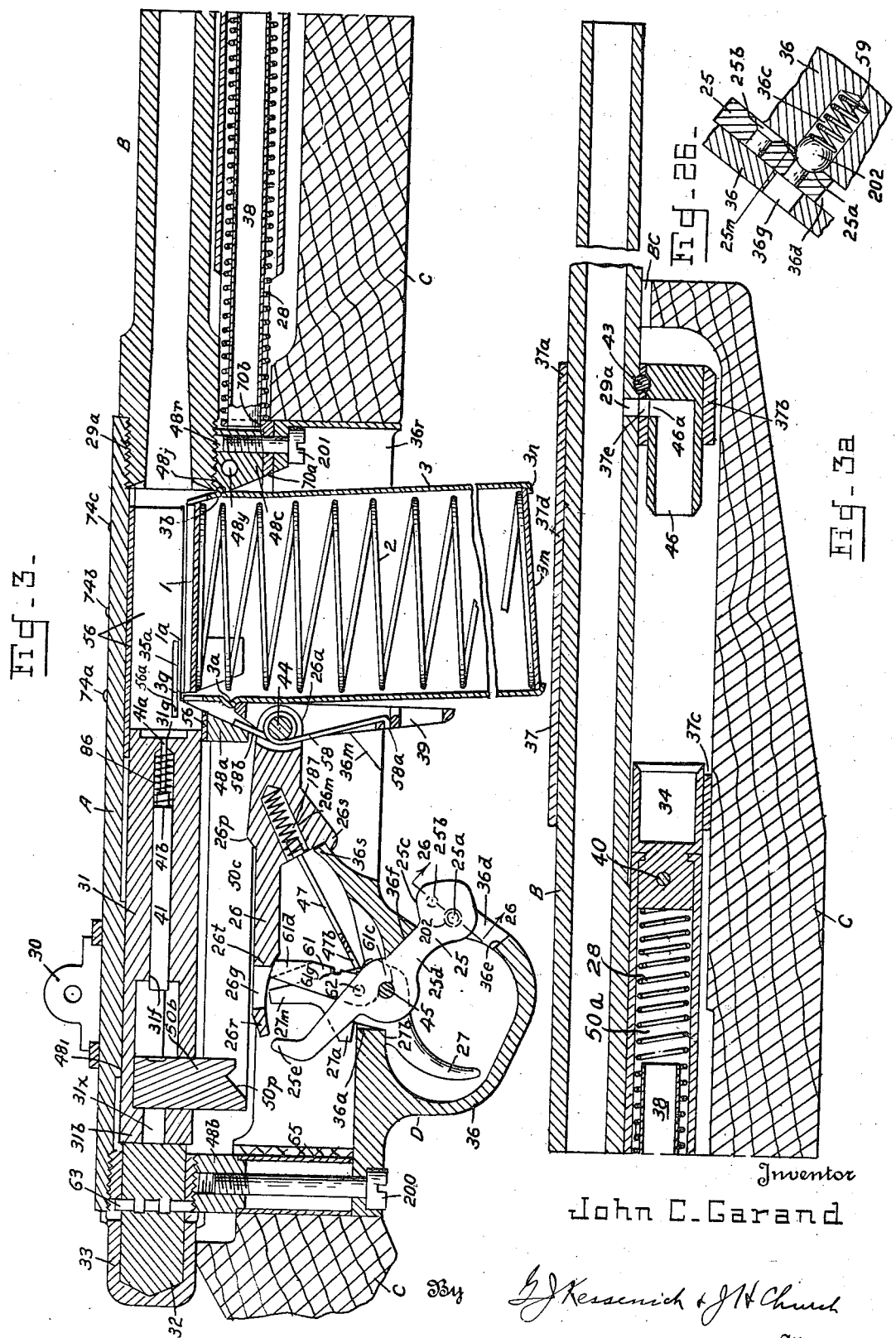
Inventor
John C. Garand

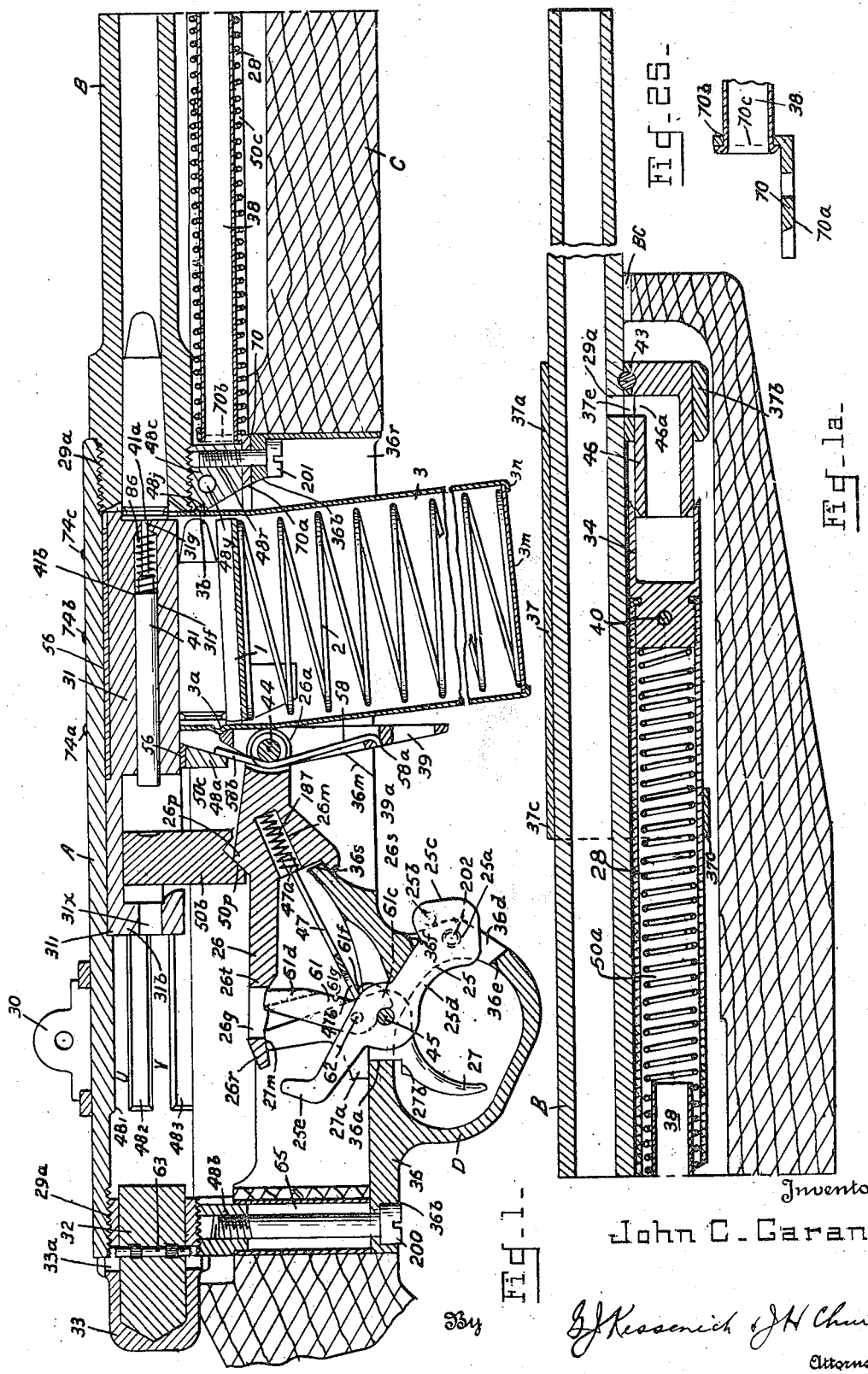

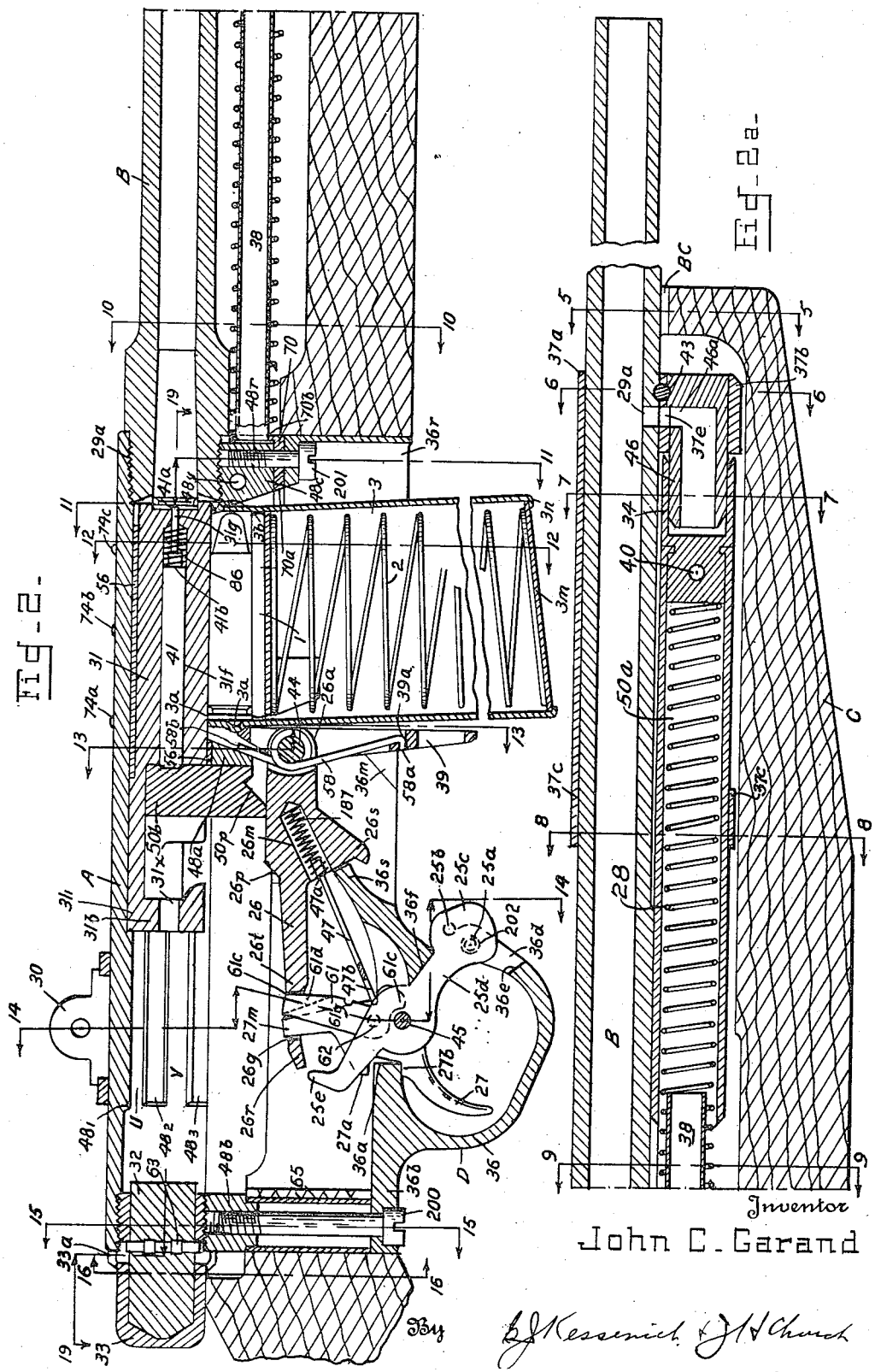

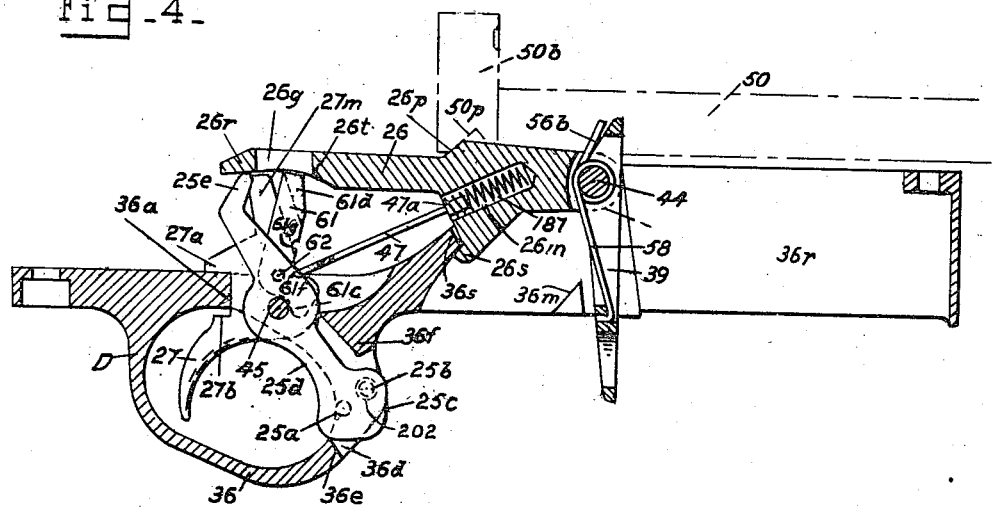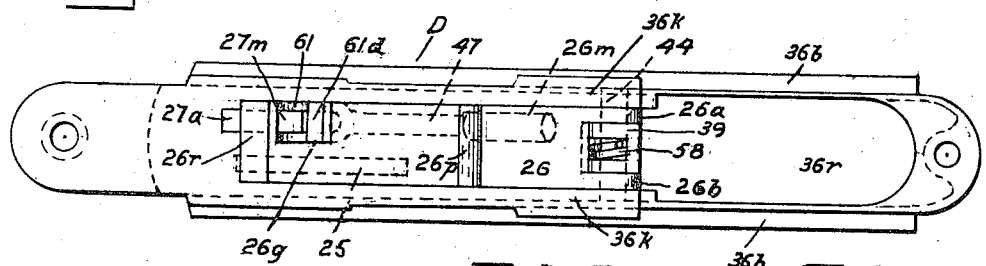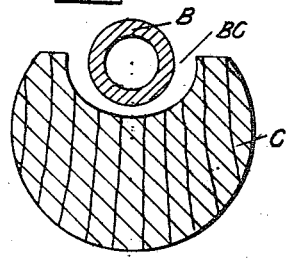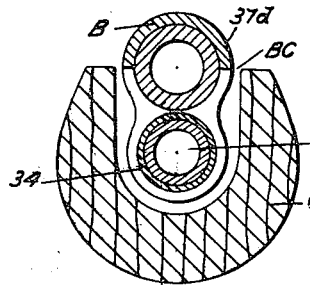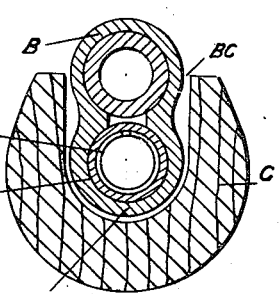

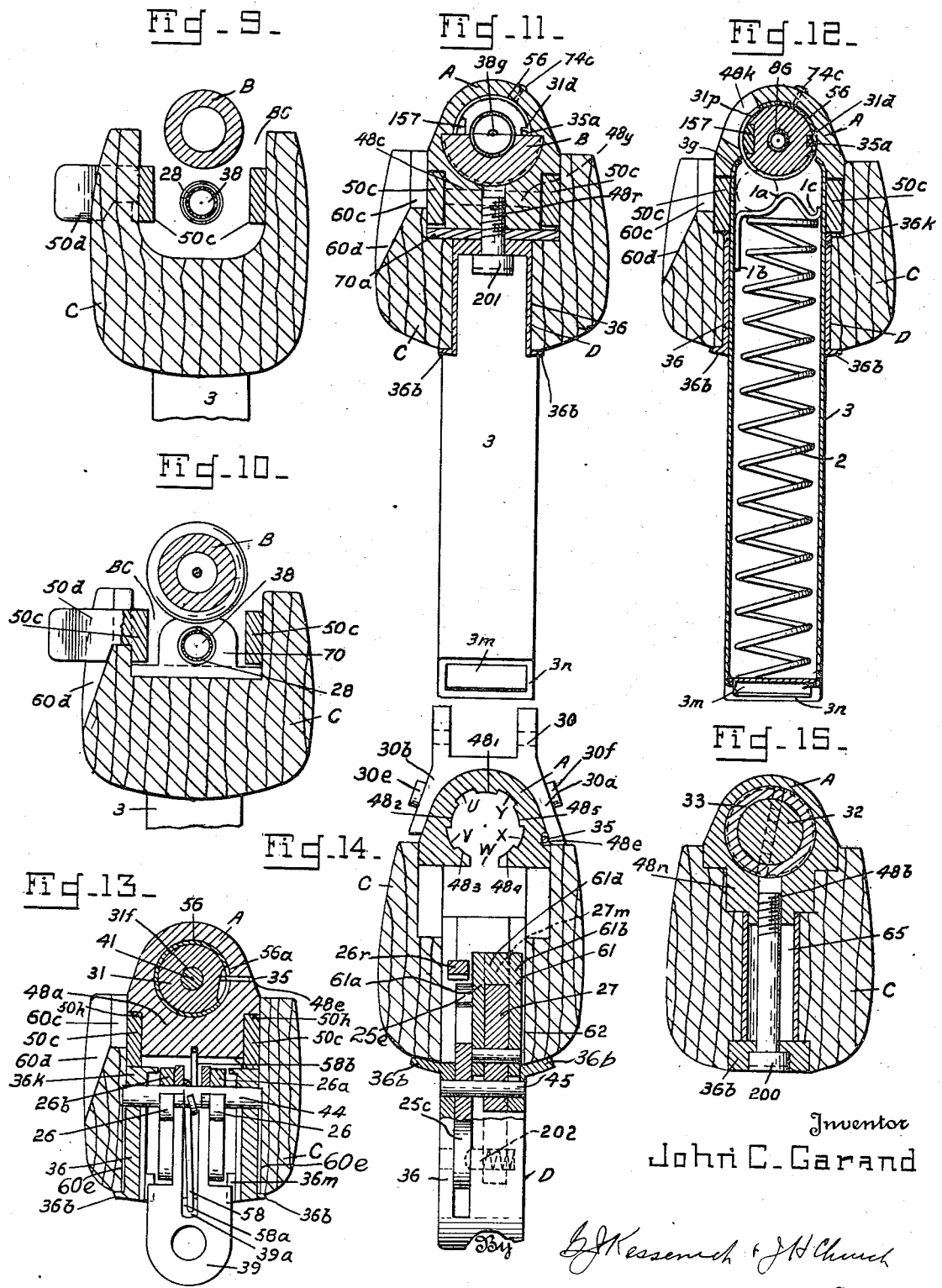

Oct. 9, 1945.  J. C. GARAND  2,386,205
FIREARM
Filed Jan. 8, 1942  8 Sheets-Sheet 6
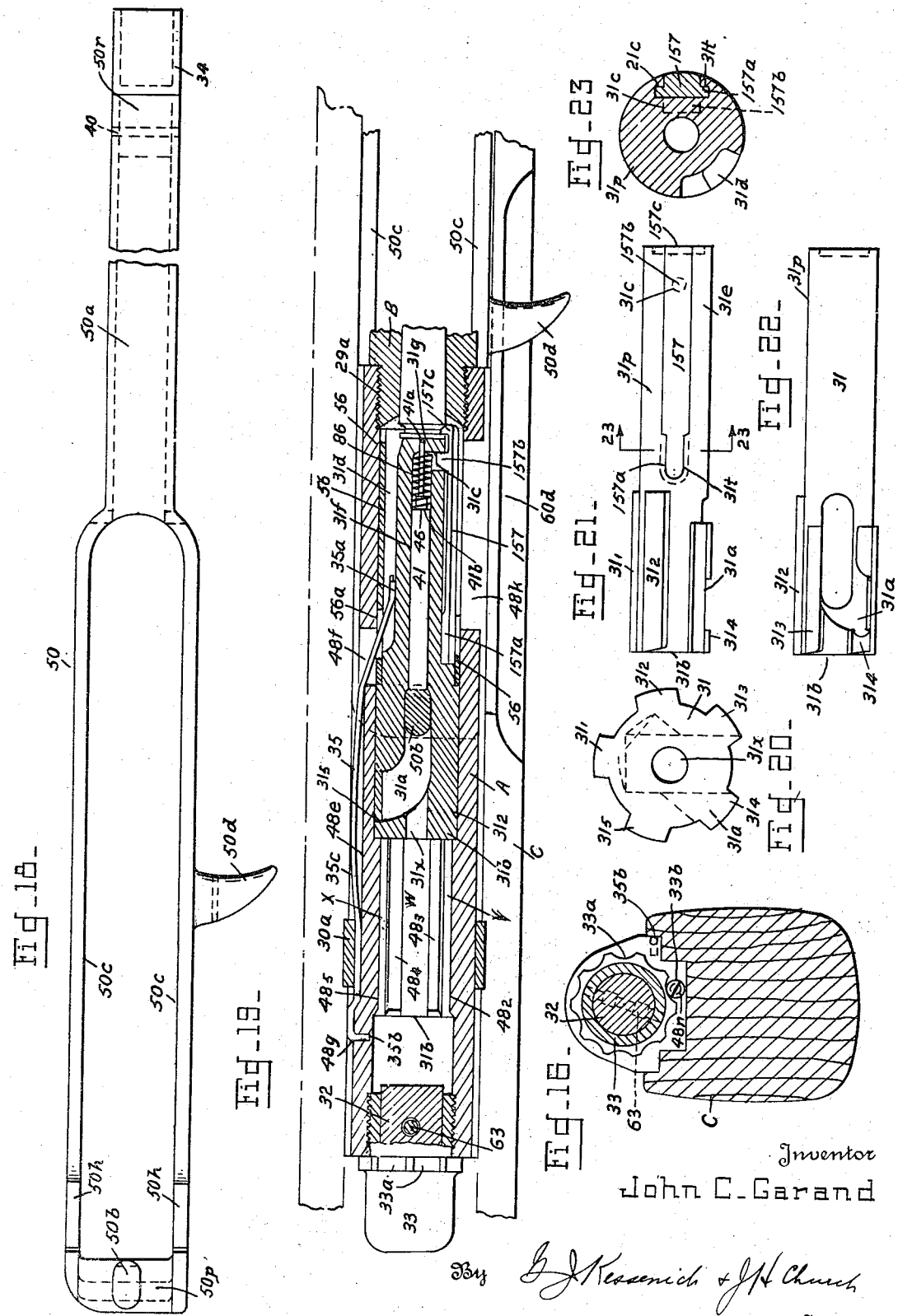
Inventor
John C. Garand

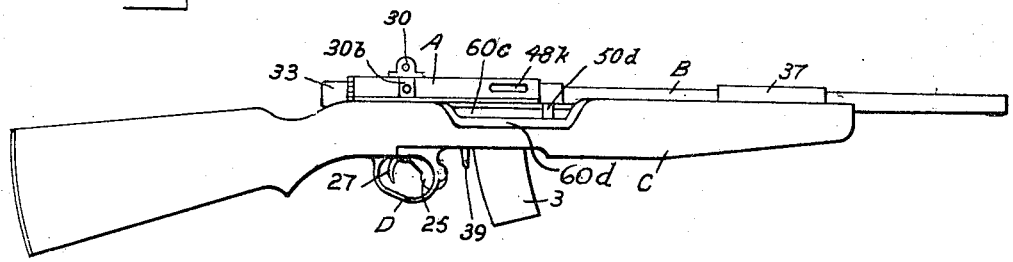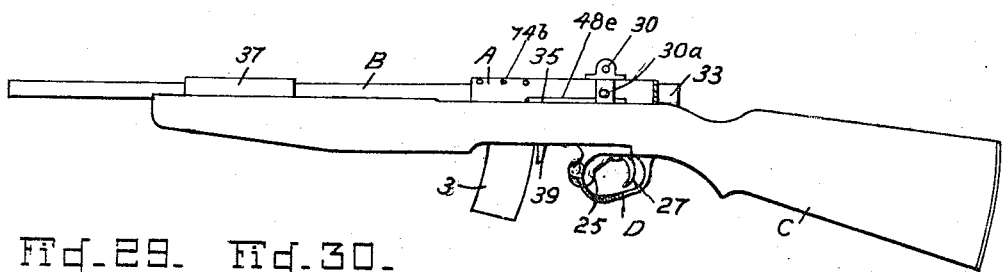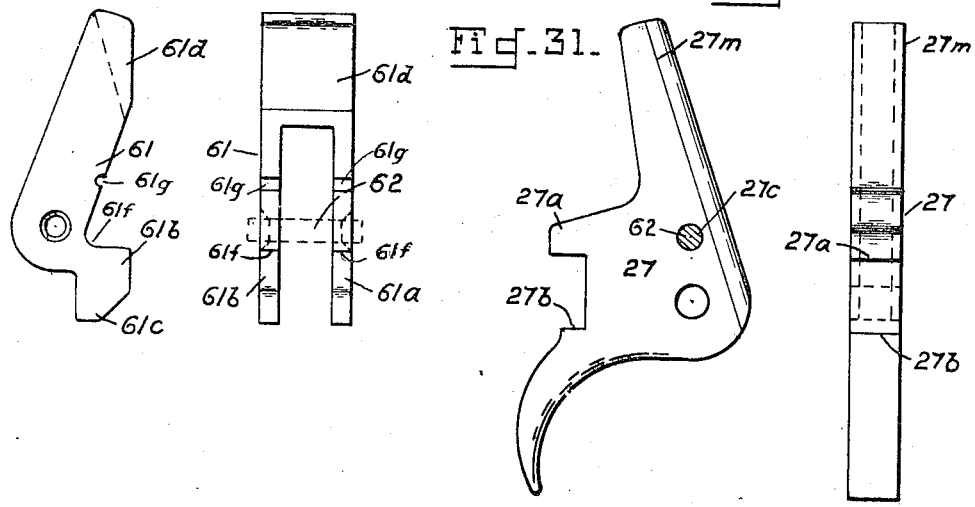

Oct. 9, 1945.   J. C. GARAND   2,386,205
FIREARM
Filed Jan. 8, 1942   8 Sheets-Sheet 8
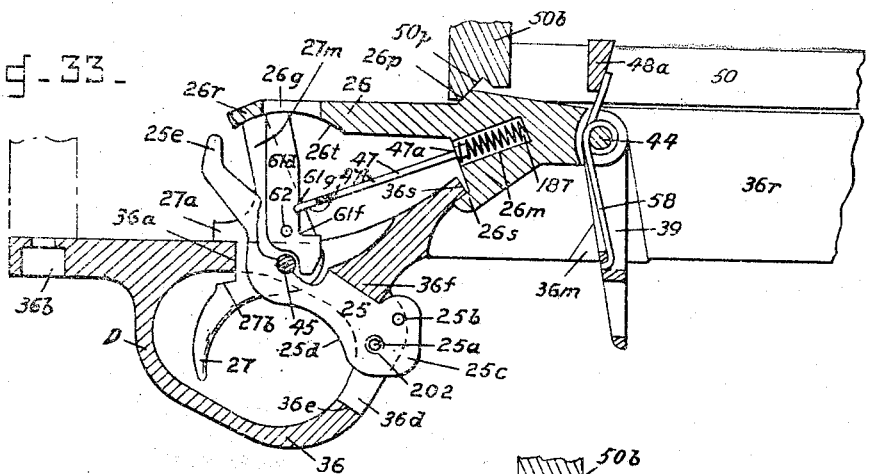
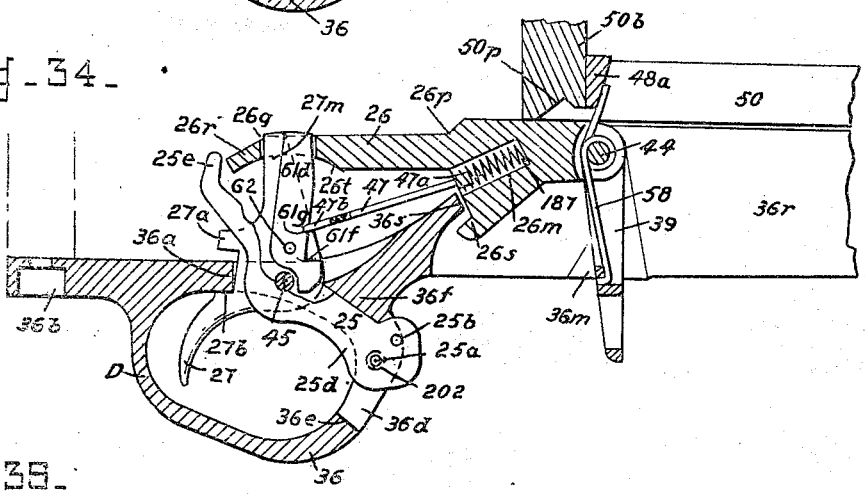
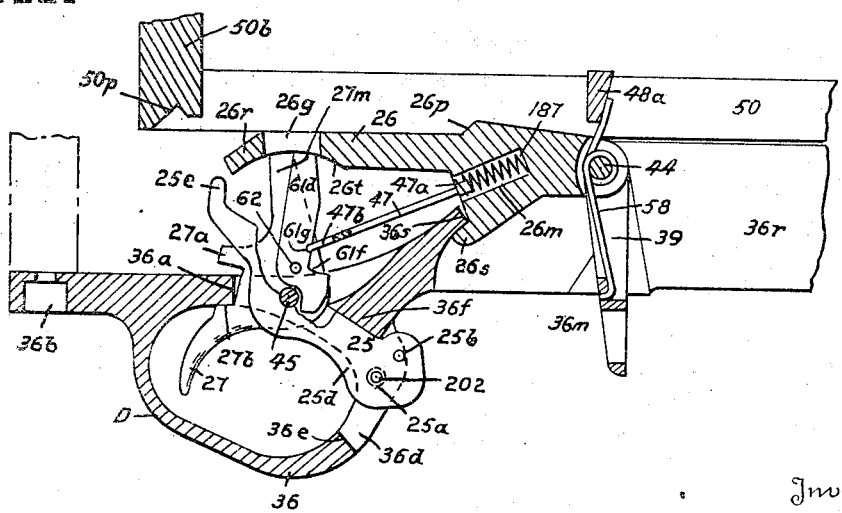
Inventor
John C. Garand Patented Oct. 9, 1945

2,386,205

UNITED STATES PATENT OFFICE 2,386,205

FIREARM

John C. Garand, Springfield, Mass.

Application January 8, 1942, Serial No. 426,036

35 Claims. (Cl. 42—3)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a firearm.

An object of this invention is to provide a firearm of light weight and of small size especially adapted for use by mounted and parachute troops.

Another object of this invention is to provide a firearm in which a gas propelled operating rod serves to actuate the bolt and strike the firing pin.

Another object of this invention is to provide a firearm having an improved sear mechanism.

Another object of this invention is to provide a firearm having a simple safety mechanism which is easily operated.

Another object of this invention is to provide a firearm with an improved means for guiding the bolt.

Another object of this invention is to provide a firearm having an improved means for producing semi-automatic fire.

Another object of this invention is to provide a firearm with an improved means for guiding and/or lubricating the bolt operating rod.

Another object of this invention is to provide a firearm with an improved means for holding the cartridge magazine.

Another object of this invention is to provide a firearm with an improved expansible gas chamber for actuating the operating rod.

Another object of this invention is to provide a firearm with an improved means for assembling an expansible chamber in communication with the barrel.

Another object of this invention is to provide a firearm with means for effectively venting the ammunition gases from an expansible gas chamber.

Another object of this invention is to provide a firearm with an improved buffer.

Another object of this invention is to provide a firearm which may be readily assembled and disassembled.

Another object of this invention is to provide a gun with an improved means for extracting and ejecting cartridges.

Another object of this invention is to provide novel means for changing the gun from an automatic fire weapon to a semi-automatic fire weapon or vice versa.

Another object of this invention is to provide a firearm which requires a partial dismantling in order to convert it from a semi-automatic fire weapon to an automatic fire weapon or vice versa.

Another object of this invention is to provide a firearm having an improved means for producing automatic fire.

Another object of this invention is to provide a firearm with means for converting it from a semi-automatic weapon to an automatic weapon or vice versa and with those means relatively inaccessible to the troops to whom the firearm is issued for use.

The specific nature of the invention as well as other objects and advantages thereof will clearly appear from a description of a preferred embodiment as shown in the accompanying drawings in which:

Fig. 1 discloses the arrangement of elements when the gun is in the cocked position. This veiw is taken in section substantially through the center of the gun and also shows the safety.

Fig. 1a is a continuation of the structure shown in Fig. 1 and is intended to be read as though attached to the right hand edge of Fig. 1.

Fig. 2 discloses the arrangement of elements when the trigger is pulled and the operating rod is in its most forward position. This view is taken in section substantially through the center of the gun and also shows the safety.

Fig. 2a is a continuation of the structure shown in Fig. 2 and is intended to be read as though attached to the right hand edge of Fig. 2.

Fig. 3 discloses the arrangement of elements when the trigger is pulled, the last cartridge is ejected and the operating rod is in its rearmost position at the end of the recoil stroke. This view is taken in section substantially through the center of the gun and also shows the safety.

Fig. 3a is a continuation of the structure shown in Fig. 3 and is intended to be read as though attached to the right hand edge of Fig. 3.

Fig. 4 discloses the arrangement of trigger elements when the safety has been moved to the "safety" position.

Fig. 5 is a view in section taken substantially on line 5—5 of Fig. 2.

Fig. 6 is a view in section taken substantially on line 6—6 of Fig. 2.

Fig. 7 is a view in section taken substantially on line 7—7 of Fig. 2.

Fig. 8 is a view in section taken substantially on line 8—8 of Fig. 2.

Fig. 9 is a view in section taken substantially on line 9—9 of Fig. 2.

Fig. 10 is a view in section taken substantially on line 10—10 of Fig. 2.

Fig. 11 is a view in section taken substantially on line 11—11 of Fig. 2.

Fig. 12 is a view in section taken substantially on line 12—12 of Fig. 2.

Fig. 13 is a view in section taken substantially on line 13—13 of Fig. 2.

Fig. 14 is a view in section taken substantially on line 14—14 of Fig. 2.

Fig. 15 is a view in section taken substantially on line 15—15 of Fig. 2.

Fig. 16 is a view in section taken substantially on line 16—16 of Fig. 2.

Fig. 17 is a plan view of the trigger guard assembly with the trigger elements in the position shown in Fig. 3.

Fig. 18 is a plan view of the operating rod.

Fig. 19 is a sectional view taken substantially on line 19—19 of Fig. 2.

Fig. 20 is a view of the rear end of the bolt.

Fig. 21 is a view in elevation of the right side of the bolt when in locked position.

Fig. 22 is a view in elevation of the bottom of the bolt when in locked position.

Fig. 23 is a sectional view of the bolt taken substantially on line 23—23 of Fig. 21.

Fig. 24 is a plan view of the sear plunger 47.

Fig. 25 discloses a means for coupling the spring guide 38 to its retainer 70.

Fig. 26 is a sectional view taken substantially on line 26—26 of Fig. 3.

Fig. 27 is a view in elevation of the right hand side of the firearm with magazine 3 in place.

Fig. 28 is a view in elevation of the left hand side of the firearm with magazine 3 in place.

Fig. 29 is a side view in elevation of the pawl 61.

Fig. 30 is an end view in elevation of the pawl 61 and with the pin 62 shown dotted.

Fig. 31 is a side view in elevation of the trigger 27.

Fig. 32 is an end view in elevation of the trigger 27.

Fig. 33 discloses the arrangement of trigger elements with the elements arranged to fire automatic; the trigger is in its normal position, i. e., the gun is cocked.

Fig. 34 discloses the same arrangement of elements as in Fig. 33 but the trigger is pulled and the operating rod is in its most forward position.

Fig. 35 discloses the same arrangement of elements as in Fig. 33 but the trigger is pulled and the operating rod is in its most rearwardmost position.

The gun disclosed in this embodiment of my invention is adapted to fire semi-automatic and automatic and also to be locked in "safety" position, but it is understood that the arrangement of elements described herein may be incorporated in a gun which might be adapted to fire fully automatic and/or which requires manual operation of the bolt after each shot.

The gun comprises a receiver A, a barrel B, a stock C and the trigger guard assembly D which also serves one of the functions of the receiver.

The features of the separate gun elements and assembly of the gun elements will be described under the following headings:

A. Trigger guard assembly.
B. Bolt structure and movement.
C. Gas operated cocking mechanism.
D. Ammunition feeding.
E. Buffer.
F. Stock.
G. Safety mechanism.
H. Semi-automatic operation.
I. Automatic operation.

A. Trigger guard assembly

The trigger guard assembly D has thereon the following elements: trigger guard 36, trigger 27, pawl 61, sear plunger 47, sear spring 187, sear 26, magazine latch 39 and latch spring 58.

The trigger 27 is pivotally mounted on the trigger guard 36 by means of pin 45 which passes through the trigger and is held in oppositely disposed walls of the trigger guard. Projections 27a, 27b on the trigger are adapted to partially surround the trigger guard portion 36a so as to limit the rotational movement of the trigger with respect to the trigger guard.

The pawl 61 has two forked portions 61a, 61b (Figs. 29 and 30) which snugly and partially encircle the trigger 27; a pin 62 which is held in the forked portions 61a, 61b passes through an oversize hole 27c (Fig. 31) in the trigger so as to allow rotational movement between pawl 61 and trigger 27. This rotational movement is limited by solid portion 61c of the pawl (Figs. 1, 2, and 3) coacting with the trigger pin 45 and by the central solid pawl portion 61d (Fig. 29), coacting with the trigger 27. In all positions of the sear 26 and trigger 27 the pawl 61 tends to rotate clockwise (Fig. 1) because of the sear plunger spring 187 if the plunger 47 is engaged in notch 61f for semi-automatic fire as shown in Figures 1, 2, 3, and 4. When the plunger is engaged in notch 61g the weapon will function as a full automatic gun as will be explained in more detail later.

A pin 44 (Fig. 13) held in oppositely disposed walls of the trigger guard 36 passes through the sear forked portions 26a, 26b, magazine latch 39 and a loop in the magazine latch spring 58 and allows rotational movement of the sear and magazine latch. The magazine latch is included within the forked portions 26a, 26b of the sear and the magazine latch spring is centrally disposed within an opening in the latch (Fig. 17). One end of the spring 58 has a bent portion 58a adapted to lie within a hollow portion 39a of the latch and the other end (58b) is straight and adapted to abut the receiver projection 48a. In assembling the trigger guard assembly D to the receiver A the spring 58 is prestressed so that it tends to rotate the magazine latch 39 clockwise in Figs. 1, 2 and 3. The receiver projection 48a also serves to limit the counterclockwise rotation of the magazine latch whereas a small trigger guard projection 36m (Figs. 1 and 13) limits the clockwise rotation of the magazine latch 39.

The sear has a hollow portion 26m within which the sear plunger spring 187 reposes. A reduced portion 47a (Fig. 24) on one end of the plunger 47 is adapted to fit into the hollow of the spring 187 and the other end 47b is forked so as to partially encircle and frictionally engage the pawl 61 at the curved portion 61f (Fig. 29). The plunger spring 187 tends to rotate the pawl 61 clockwise (Fig. 1) about its pivot pin 62 and simultaneously tends to move the sear 26 upwards around its pivot pin 44 and, due to the coupling between the pawl and trigger, tends to rotate the trigger 27 counterclockwise (Fig. 1).

The trigger guard has also an aperture 36r through which the magazine 3 is adapted to pass.

The elements described above are mounted on the trigger guard. The trigger guard itself forms a closure member for the hollow portion of the stock which receives the trigger guard assembly and it is fastened to the receiver by means of the screws 200 and 201.

The screws 200 and 201 are screwable in tapped holes 48b and 48r, respectively, in the receiver A. Bushing 65 serves to space the receiver from the trigger guard a predetermined distance at the rear of the gun whereas the guide retainer 70 (Fig. 25) has an L-shaped cross section and has a flat portion 70a (Fig. 11) at the forward end of the gun between the receiver A and the trigger guard D.

B. The bolt structure and movement

The bolt 31 has five equally spaced parallel radially extending lugs $31_1$, $31_2$, $31_3$, $31_4$, $31_5$, (Fig. 21), which are adapted to cooperate with counter lugs $48_1$, $48_2$, $48_3$, $48_4$, $48_5$ formed integral with the receiver A (Fig. 14). When the bolt is in the closed position the receiver counter lugs form abutments for the bolt lugs and as the bolt is moved backwards the bolt lugs are guided by channels U, V, W, X and Y which are defined by the spaced counter lugs; the bolt is rotated approximately one-tenth of a revolution by the operating rod projection 50b cooperating with the cam cut 31a (Fig. 22) in the bolt as the operating rod 50 moves in its straightline movement. The rear bolt end 31b is adapted to abut the buffer rod 32 at the end of the bolt travel so that the kinetic energy of the moving parts may be absorbed gradually.

The resilient nature of extractor 157 (Fig. 21) is utilized to keep it on the bolt. The extractor has a flanged portion 157a (Fig. 23) which is adapted to snugly fit in the bolt hollow portion 31t and the circular extractor projection 157b (Fig. 19) is free to move in the circular bolt hole 31c as the extractor head 157c grasps and releases a cartridge head. The resilient nature of the extractor tends to force the extractor projection 157b into the bolt hole 31c.

The ejector 35 (Fig. 19) is mounted on the receiver A in the receiver groove 48e. The ejector head 35a is adapted to project through receiver hole 48f and inner sleeve hole 66a, and the bent ejector portion 35b is adapted to fit into receiver hole 48g. The relatively straight ejector portion 35c is adapted to fit in the receiver groove 48e and to be held therein by the longer rear sight base leg 36a (Fig. 14) which extends over the receiver groove 48e. In the preferred embodiment of this invention the ejector resiliently abuts the bolt but it is understood that the ejector may lie in a bolt groove without touching the body of the bolt.

The bolt has a slot 31d (Fig. 19) within which the resilient ejector head 35a is disposed. The ejector head 35a abuts the bottom of groove 31d resiliently so that the ejector head 35a follows the contour of the bottom of the slot and abuts against a cartridge which is held by the extractor 157 as the bolt is moved backwards.

The particular sights used on this gun are not the subject of this invention and it is obvious that any of the well-known sights may be mounted on the gun without disturbing its operation. A sight base 36, however, is disclosed which has two legs 36a, 36b, one of which is purposely made longer so as to hold the ejector 35 in receiver groove 48e (Figs. 14 and 19). The sight base 36 is held on the receiver leg by means of two screws 36e, 36f.

The bolt is guided and moves in its sleeve 66 which is fastened to the receiver A by three rivets 74a, 74b, 74c (Fig. 3), or the sleeve may be fastened to the receiver A by welding, brazing, or any other means. The sleeve 66 is formed from a tubular member which has suitable cuts therein so as to provide clearance for (1) the entrance of the cartridges into the bolt chamber, (2) the movement of the operating rod projection 50b, (3) the extraction of the cartridge out of the receiver hole 48k (Fig. 19) and, (4) the protrusion of the ejector head 35a into the bolt slot 31d. The sleeve is formed from a tubular member and the cuts therein for the above clearances are judiciously made so that the bolt round portion 31p (Fig. 21) has the optimum amount of sleeve bearing surface.

The firing pin 41 is centrally disposed in the cylindrical bolt hole 31f with the reduced portion 41a projecting through the smaller aligned bolt hole 31g. A coil spring 86 abuts the firing pin shoulder 41b and the solid portion of the bolt which defines the smaller hole 31g thus causing the reduced portion 41a to be normally held within the confines of the bolt. The firing pin 41 is free to slide in the bolt hole 31f and the firing pin 41 is long enough so that it cooperates with the operating rod projection 50b in preventing the firing pin from becoming separated from the bolt. The firing pin 41 is assembled through bolt hole 31x.

C. Gas operated cocking mechanism

The ammunition gas for operating the cocking mechanism is allowed to flow into the stationary piston 46 through an aperture 29a in the barrel. The gas moves the gas cylinder 34 and operating rod 50 against the action of spring 28 which is seated at one end against the guide retainer 70 at 70b and at the other end against the cylinder 34. A hollow tubular spring guide 39 fits into a cooperating hole 70b (Fig. 25) in the guide retainer 70 and is held therein by enlarging the end of tubular guide by flaring it or the tube may be held in hole 70c by any other mechanical means.

The operating rod 50 serves to rotate the bolt approximately one-tenth of a turn and also to move the bolt in its longitudinal direction. A projection 50b on the operating rod serves as a hammer for the bolt firing pin 41. The operating rod (Fig. 18) has integral therewith the tubular portion 50a within which operating spring 28 fits, projection 50b which is adapted to have a straight-line motion for actuating the bolt and striking the bolt firing pin, a hollow portion defined by spaced portions 50c within which inter alia the magazine 3 reposes, a finger 50d for manual operation of the operating rod, a sear engaging cam surface 50p, and means for holding gas cylinder 34. The last recited means is shown in the drawings as comprising a hollow portion 50r through which a pin 40 passes but it is understood that cylinder 34 may be secured to the operating rod by welding, brazing or by mechanical means and the cylinder 34 may be made integral with the operating rod.

The bracket 37 and the straight pin 43 hold the piston 46 in fixed position on the barrel B. At the forward end (Fig. 6) a cylindrical portion 37a of the bracket encircles the barrel and a joined cylindrical portion 37b encircles the piston 46; the pin 43 passes through oppositely disposed grooves in the barrel and piston and the ends of the pin 43 are held in the walls of the bracket. The rearward portion of the bracket (Fig. 8) has substantially an elliptical cross-sectioned portion 37c depressed so as to snugly fit around the barrel B and tubular operating rod portion 50a. A semi-cylindrical portion 37d (Fig. 7) which partially encircles the barrel joins the substantial elliptical section 37c and double cylinder ends 37a, 37b of the bracket. A hole 37e in the bracket is held in aligned relation with the barrel opening 29a and with the opening 46a in the piston by means of the pin 43 which cooperates with grooves in the barrel and piston 46.

The cylinder 34 fits into the hollow portion 50r of the operating rod and is held therein by means of the cylindrical pin 40 which is held in the walls of the operating rod. The stationary piston 46 snugly fits into the hollow of the movable cylinder 34 in the cocked position (Fig. 1) but when the gun is fired the cylinder moves out of sliding relation with the piston due to the impact on the cylinder caused by the gases of the ammunition; during the last part of the piston stroke the ammunition gases escape from the chamber formed by the piston and cylinder and pass through the openings designated as BC between the stock and the barrel but insufficient momentum is imparted to the cylinder during the first portion of the cylinder stroke to carry the associated operating rod through the cocking operation. The ends of piston 46 and cylinder 34 are tapered slightly so as to guide the movable cylinder in its engagement with the piston.

The barrel B is held in the receiver A by means of cooperating screw threaded portions 29a on the barrel and receiver respectively but it is understood that other fastening means may be used and the barrel B may be made integral with the receiver A.

A very small clearance is provided between the operating rod and bracket portion 37c so that it serves as one of the guides for the operating rod; also, the projection 48a on the receiver is adapted to lie within the hollow portion defined by walls 50c of the operating rod with a very small clearance and forms another guide, also, the upper trigger guard surface 36k (Figs. 12, 13 and 17) serves as a guide, and, also, the operating rod has a raised portion 50h (Figs. 13 and 18) which makes a close fit with the bottom surface of the receiver as the operating rod moves; these four guide means allow that precise longitudinal movement necessary for the coupling of the cylinder 34 and piston 46 and yet rotational movement of the operating rod is prevented so that the projection 50b on the operating rod has substantially a straight-line movement. The receiver projection 48c also is adapted to lie within the hollow portion defined by walls 50c of the operating rod but projection 48c is smaller in width than projection 48a so that lubricating material may be stored in and collected from the hole 48y in projection 48c as the operating rod moves back and forth; a thin film of lubricating fluid is thus present on the inner surfaces of the operating rod walls 50c.

The operating rod projection 50b serves as a hammer for the bolt firing pin 41 and cooperates with cam cut 31a (Figs. 20–22) in the bolt to rotate the bolt in and out of locked position by moving bolt lugs 31₁, 31₂, 31₃, 31₄, 31₅ with respect to the fixed receiver counter lugs 48₁, 48₂, 48₃, 48₄, 48₅.

The operating rod has the projection 50d adapted to be grasped by the operator so that he may manually operate the cocking mechanism.

D. Ammunition feeding

The magazine 3 is held in feeding position by means of the recessed receiver portion 48j and the magazine latch 39; magazine projections 3b and 3a are adapted to fit in the receiver recess 48j and behind the spring biased latch 39 respectively when the magazine 3 is shoved upwards into the trigger guard opening 36r. In order to remove the magazine 3, the latch 39 is rotated against the action of its spring 53 and the magazine is simultaneously pulled down and rotated about the junction of the projection 3b and recessed receiver portion 48j. Sufficient clearance is provided in the trigger guard to accommodate the rotational movement of the magazine.

The magazine holds approximately twenty rounds of ammunition which are normally pressed upwards by the action of spring 2 against the movable follower 1. The fixed end of spring 2 abuts the fixed removable plate 3m which is pressed against and held by magazine flanges 3n. The magazine 3 is positioned so that the bolt cylindrical portion 31p passes within the confines of the arcuate magazine end sections, which define the mouth 3g with the result that the particular ammunition round disposed therein is stripped from the magazine as the bolt travels to its home position.

The follower 1 is preferably made of sheet material and has the portion 1a extending in the direction of the ammunition rounds and raised so that adjacent rows of ammunition rounds are displaced a distance equal to the radius of the round. Follower portion 1b is adapted to abut against the side of the magazine to assure a straight-line movement of the follower and to prevent the follower from pivoting when the follower projection 1c abuts the magazine curved sections which define the mouth 3g after the last ammunition round has been stripped from the magazine. When the last round is stripped the raised follower portion abuts against the forward end of the bolt so as to maintain it in the open position.

E. Buffer

The buffer 32 serves to bring the bolt and operating rod to a stop gradually. The buffer material is of cellulose acetate or other similar resilient material and formed in the shape of a rod; one end of it is adapted to abut the bolt and the other end fits in housing 33. The housing 33 is screwable in the end of receiver A and has a plurality of reentrant portions 33a (Fig. 16) into which the head of a screw 33b is adapted to lodge so as to lock the buffer housing on the receiver. Screw 33b is screwable in the tapped hole 48n (Fig. 16) in the receiver projection 48b. The buffer 32 is held in its housing 33 by means of a knurled pin 63 which passes through the buffer rod and is loosely held by the walls of housing 33. The stock must be removed before the buffer housing can be removed because access must be had to the locking screw 33b (Fig. 16). It is understood that other locking arrangements for the buffer housing may be provided and that the stock may be arranged so that access may be had to the locking means without removing the stock or shifting the position of the stock.

F. Stock

The stock C is clamped to the receiver A by the flanged trigger guard portion 36b (Fig. 17) which is drawn up against the receiver by means of the screws 200 and 201. The stock has two openings therethrough extending from the top to the bottom of the stock; one of the openings is for the passage of screw 200 and the other opening is closed by the trigger guard but for the magazine opening 36r which is lined by metal of the trigger guard. The stock fits the receiver closely along its length but for a tapered portion 60d and a cutout portion 60c for the actuation of operating rod handle 50d. Openings BC between the stock and barrel allow unrestricted cooling of the barrel B and provide a passage for the ammunition gases which actuate the cocking mechanism.

Sear pivot pin 44 while longer than appears to be necessary, as shown in Fig. 13, engages in oppositely disposed grooves 60c in the inner walls of the stock C, which serve to guide the trigger guard in assembling the gun. Obviously the pivot pin 44 could be finished flush with the housing and the grooves 60e omitted.

The stock fits the contour of the buffer housing 33 closely and encloses the buffer housing locking screw 33b.

G. Safety mechanism

The gun is locked in inoperative position by means of the safety 25 which is pivotable on the trigger pin 45. The safety 25 is held in the unlocked and locked positions by means of ball 202 (Fig. 26) in the trigger guard recess 36c cooperating with the countersunk holes 25a and 25b, respectively, in the safety 25. The safety 25 is movable in the trigger guard groove 36d and the groove walls 36e and 36f limit the movement of the safety. Auxiliary trigger guard hole 36g (Fig. 26), allows assembly of the ball 202 and compression spring 59 in the trigger guard recess 36c.

In order to disassemble the safety from the gun it is necessary to remove the trigger pin 45, depress ball 202 by inserting a rigid member through the trigger guard hole 36g and simultaneously pull the safety through the trigger guard groove 36d. Provision is also made to cause the safety 25 to be more easily moved from the firing position to the safety position than vice versa by making the taper on hole 25a at 25m a little greater than the taper of hole 25b; by providing the taper at 25m the ball 202 is more easily cammed against spring 59.

The gun may be conveniently and quickly locked by the operator by a simple movement of his trigger finger, i. e., by pulling the safety projection 25c backwards. Also, the gun may be conveniently unlocked by the operator by a simple movement of his trigger finger, i. e., by pressing forward on the safety portion 25d.

In the safety position (Fig. 4) the safety projection 25e is of sufficient length so as to press the sear projection 26p up against the operating rod cam surface 50p a distance further than the sear projection 26p extends when it normally holds the operating rod; this is one of the requirements of a good safety for then the operator knows the rifle is in the safety position if pulling the trigger is accomplished without much resistance.

H. Operation

It is normally expected that the gun will be used to fire semi-automatic, although means to be hereinafter described are incorporated to permit a change to full automatic operation. The cartridge follower 1 is adapted to be in position to hold the bolt open when the last round of ammunition has been fired (Fig. 3).

Rounds of ammunition are stripped from the magazine 3 as the bolt 31 moves forwardly to its locked position. In going to the locked position the bolt 31 is moved longitudinally and rotated by the straight-line motion of the ammunition gas propelled operating rod projection 50b which moves in the bolt cam cut 31a. Operating rod projection 50b also serves to strike the bolt firing pin 41. The sear projection 26p is adapted to coact with operating rod projection 50b at 50p after it has moved the bolt to its locked position but before the projection 50b strikes the firing pin 41.

The operating rod projection 50b, after it has rotated and moved the bolt backwards due to the ammunition gases acting on movable cylinder 34, is biased forward by the driving spring 28 until the motion of the operating rod is arrested by the sear projection 26p engaging the cam surface 50p; it would then be necessary to operate the trigger 27 before the bolt projection 50b is allowed to move forward and strike the firing pin 41.

The sear projection 26p is held in the path of motion of the operating rod by means of trigger extension 27m in the cocked position (Fig. 1) and by pawl 61 when the operating rod returns from its recoiled position (Fig. 3).

In the cocked position (Fig. 1) trigger extension 27m is biased under the sear portion 26r by means of spring 187 which acts through pawl 61 and connecting pin 62 on trigger 27. As the trigger is pulled the trigger extension 27m slides along the sear portion 26r and then falls into the sear opening 26g thus allowing the operating rod driving spring 28 to cam the sear projection 26p downward out of engagement at 50p and allowing the operating rod projection 50b to strike the firing pin 41. As the operating rod is driven backwards due to gas pressure on movable cylinder 34 the spring 187 forces the sear up until its motion is arrested by sear projection 26s cooperating with the trigger guard stop 36s and due to the finger pressure of the operator the pawl 61 will rotate about its pivot pin 62 under the sear portion 26t so that when the operating rod returns from its recoil position it cannot depress the sear because its motion is blocked by pawl 61; thus it is necessary to release the trigger in order that pawl 61 may be brought out of engagement with sear portion 26t. However, as the trigger is released the trigger portion 27m engages the sear portion 26r before pawl 61 disengages sear portion 26t so that the operating rod is still held by the sear 26 at 50p. The above operation of the pawl and trigger brings about the semi-automatic characteristic of the gun, i. e., the characteristic of having to release the trigger each time a round of ammunition is fired.

In order to prevent excessive shock of the bolt against the receiver, the buffer 32 of cellulose acetate or similar material is placed in the path of the bolt so as to arrest the backward movement of the bolt in recoil.

The gun is locked by manipulating the safety 25.

Access is readily had to the operating parts of the gun by removing screws 200, 201 thus allowing separation of the trigger guard assembly D from the stock C and barrel and receiver assembly. In order to disassemble the last mentioned assembly the retainer 70 is pulled downwards thus releasing the driving spring 28 and the parts held in biased position by the driving spring. The barrel B may be screwed out of the receiver A at 29a.

I. Automatic operation

Figs. 33–35 disclose the position of the trigger group elements in the course of firing the firearm when those elements are arranged for automatic fire.

In order to convert the gun from a semi-automatic weapon to an automatic weapon, plunger 41 is disengaged from the pawl 61 at 61f and brought into engagement with the pawl notched portion 61g, or vice versa if it is desired to convert the gun from an automatic weapon to a semi-automatic weapon. When the plunger 47 engages the pawl 61 at 61f the pawl is biased to pivot clockwise about its pin 62 due to the action of spring 187 and this is so during the entire semi-automatic firing cycle, whereas when the plunger 47 engages the pawl 61 at 61g the pawl is biased to pivot counterclockwise about its pin 62 due to the action of spring 187 and this is so during the entire automatic firing cycle. The notch 61g is located above the pivot point 62 of the pawl 61. When the plunger 47 is positioned to engage notch 61g it is held in such a position that if the trigger is not released upon the firing of a cartridge, the sear 26 will not be supported by the pawl 61 as the bolt drives another cartridge into the chamber; hence the sear projection 26p will not be held in the path of motion of the operating rod and the firearm will immediately fire again, continuing its fire so long as the trigger is depressed. It is noted that in all positions shown in Figures 33-35 the pawl portion 61d abuts the trigger portion 27m and the pawl may be considered to be a portion of the trigger.

Plunger 47 may be conveniently shifted from engagement with pawl 61 at 61f to 61g by engaging the bifurcated portions 47b of plunger 47 with the nose of a bullet and shifting the plunger. Of course the firearm would have to be partially disassembled to accomplish such changes, i. e., bolts 200, 201 would have to be unscrewed and the trigger guard assembly D pulled out of the stock C.

I claim:

1. In a firearm, an operating rod, a cylinder, means for fastening the cylinder to the operating rod, a piston telescoped within the cylinder, a barrel, a bracket surrounding the barrel and piston, a member inserted in the bracket for securing the barrel to the piston, and an extension on the bracket surrounding a portion of and forming a guide for the operating rod.

2. In a firearm, a sear pivotally mounted on the firearm and having a free end with an aperture defined by two edges, a trigger pivotally mounted on the firearm and having a projection adapted to engage one of the edges, a pawl pivotally mounted on the trigger and having a projection adapted to engage the other edge, means for limiting the relative movement of the trigger and pawl, and a resilient connection between the sear and pawl.

3. In a firearm, a sear pivotally mounted on the firearm and having a free end with an aperture defined by two edges, a trigger pivotally mounted on the firearm and having a projection adapted to engage one of the edges, a stop on the firearm, a pawl pivotally mounted on the trigger and having a projection adapted to engage the other edge, a second projection on the pawl adapted to engage the stop, means for limiting the relative movement of the trigger and pawl, and a resilient connection between the sear and pawl.

4. In a firearm, a sear pivotally mounted on the firearm and having a free end with an aperture defined by two edges, a trigger pivotally mounted on the firearm and having a projection adapted to engage one of the edges, a pawl pivotally mounted on the trigger and having a projection adapted to engage the other edge, a stop on the firearm, a second projection on the pawl adapted to engage the stop, means for limiting the relative movement of the trigger and pawl, and resilient means engaged between the pawl and sear for exerting a force on a line intersecting the line joining the stop and the pawl pivot point.

5. The same as in claim 3 and the stop consists of a pin upon which the trigger is pivotally mounted.

6. The same as in claim 4 and the stop consists of a pin upon which the trigger is pivotally mounted.

7. In a firearm, a sear pivotally mounted on the firearm and having a free end with an aperture defined by two edges, a trigger pivotally mounted on the firearm and having a projection adapted to engage one of the edges, a pawl pivotally mounted on the trigger and having a projection adapted to engage the other edge, a stop, a second projection on the pawl adapted to engage the stop, means for limiting the relative movement of the trigger and pawl, a spring, said sear having a seat for the spring, and a plunger joining the spring and pawl.

8. The same as in claim 7 and the stop consists of a pin upon which the trigger is pivotally mounted.

9. In a firearm, a swingably mounted safety member a trigger guard having a slot therein defined by two spaced portions, a portion of said safety being adapted to move in the trigger guard slot, detent receiving depressions in the portion of the safety arranged to move in the slot, a chamber in one of the trigger guard portions intersecting the slot, a spring biased ball in the chamber and adapted to engage alternatively one or another of the depressions in the safety portion as the safety member is moved, and a hole in the other trigger guard portion in opposition to the chamber therein for the passage of the ball into the first mentioned trigger guard portion.

10. In a firearm, a sear, a safety having a projection adapted to engage the sear, a trigger having a projection adapted to engage the sear, a pin held by the firearm and mounting the trigger and safety, a trigger guard having a slot therein defined by two spaced portions, a projection on said safety being arranged to move in the trigger guard slot, extensions on the last mentioned projection and disposed outside and inside the confines of the trigger guard, said extensions being arranged to be engaged by a human trigger finger, one of the spaced trigger guard portions having a spring biased ball therein engaging the last mentioned safety projection, and the other one of the spaced trigger guard portions having a hole therethrough in apposition to the chamber in the first mentioned of the spaced trigger guard portions allowing passage of the ball in assembling the mechanism.

11. In a firearm, a receiver a longitudinal groove in the outer surface of the receiver, a hole communicating between the groove and the interior of the receiver, a bolt in the receiver, a resilient ejector rod adapted to lie in the receiver groove with one end extending through the hole and resiliently abutting the bolt, a sight base having a projection adapted to overlie the ejector rod and partially close the receiver groove, and means for fastening the sight base to the receiver.

12. In a firearm, a receiver, a groove extending longitudinally in the outer surface of the receiver, a hole in the receiver at the forward end of the groove and communicating with the interior of the receiver, a bolt, a slot in the bolt, an ejector rod adapted to lie in the receiver groove with one end extending through the receiver hole into the bolt slot, and means for fastening the rod to the receiver at the rear end of the groove.

13. In a firearm, a receiver, a groove in the outer surface of the receiver, a hole in the receiver at the forward end of the groove and communicating with the interior of the receiver, a bolt, a resilient ejector rod adapted to lie in the receiver groove with one end extending through the receiver hole and resiliently engaging the bolt, and means for fastening the rod to the receiver.

14. The same as in claim 13 and a slot in the bolt, said ejector rod end extending into the slot in the bolt.

15. In a firearm, a receiver, a hole in the receiver extending from the outside to the inside of the receiver, a bolt having a slot therein, an ejector rod extending rearwardly along the outside of the receiver and extending through the receiver hole into the bolt slot, a sight base having a projection, and means including the base projection for fastening the rear portion of the rod to the receiver.

16. In a firearm, a receiver, a longitudinal groove in the exterior of the receiver, two holes in the receiver at opposite ends of the groove, a bolt, a resilient ejector rod adapted to lie in the receiver groove with one end extending through the forward receiver hole and resiliently engaging the bolt, said ejector rod having its other end insertable in the other receiver hole, and means for overlapping the rear portion of the rod and partially closing the receiver groove.

17. The same as in claim 16 and the last mentioned means comprises a sight base.

18. In a firearm, a sear pivotally mounted on the firearm and having a free end, a trigger pivotally mounted on the firearm and having a projection adapted to abut the sear free end, a pawl pivotally mounted on the trigger between the trigger pivot and the trigger projection, a projection on the pawl adapted to engage the sear free end, means for limiting the relative movement of the trigger and pawl and a resilient connection bearing on the sear and the pawl, said pawl and connection being so constructed and arranged that the connection is selectively engaged with the pawl on either side of a line passing between the pawl pivot pin and the point at which the resilient connection bears upon the sear.

19. In a firearm, a sear pivotally mounted on the firearm and having a free end, a trigger pivotally mounted on the firearm and having a projection adapted to engage the sear free end, a fixed stop, a pawl pivotally mounted on the trigger between the trigger pivot and the trigger projection and having two projections, one of said pawl projections being adapted to engage the sear free end and the other projection being adapted to engage the stop, means for limiting the relative movement of the trigger and pawl and a resilient connection bearing on the sear and the pawl, said pawl and connection being so constructed and arranged that the connection is selectively engaged with the pawl on either side of a line passing between the pawl pivot pin and the point at which the resilient connection bears upon the sear.

20. In a firearm, a sear pivotally mounted on the firearm and having a free end with an aperture defined by two edges, a trigger pivotally mounted on the firearm and having a projection adapted to engage one of the edges, a pawl pivotally mounted on the trigger and having a projection adapted to engage the other edge, means for limiting the relative movement of the trigger and pawl and a resilient connection bearing on the sear and the pawl, said pawl and connection being so constructed and arranged that the connection is selectively engaged with the pawl on either side of a line passing between the pawl pivot pin and the point at which the resilient connection bears upon the sear.

21. In a firearm, a sear pivotally mounted on the firearm and having a free end with an aperture defined by two edges, a trigger pivotally mounted on the firearm and having a projection adapted to engage one of the edges, a stop on the firearm, a pawl pivotally mounted on the trigger and having a projection adapted to engage the other edge, a second projection on the pawl adapted to engage the stop, means for limiting the relative movement of the trigger and pawl and a resilient connection bearing on the sear and the pawl, said pawl and connection being so constructed and arranged that the connection is selectively engageable with the pawl on the desired side of a line passing between the pawl pivot point and the point at which the resilient connection bears upon the sear.

22. In a firearm, a sear pivotally mounted on the firearm and having a free end with an aperture defined by two edges, a trigger pivotally mounted on the firearm and having a projection adapted to engage one of the edges, a pawl pivotally mounted on the trigger and having a projection adapted to engage the other edge, a stop on the firearm, a second projection on the pawl adapted to engage the stop, means for limiting the relative movement of the trigger and pawl and a resilient connection bearing at one end upon the sear and at the other end upon the pawl, said pawl and connection being so constructed and arranged that the connection may be shifted to engage the said other end of the connection with the pawl alternatively on either side of a line passing between the pawl pivot point and the point at which the resilient connection bears upon the sear.

23. The same as in claim 19 and the stop consists of a pin upon which the trigger is pivoted.

24. The same as in claim 21 and the stop consists of a pin upon which the trigger is pivotally mounted.

25. The same as in claim 22 and the stop consists of a pin upon which the trigger is pivotally mounted.

26. In a firearm, a sear pivotally mounted on the firearm and having a free end with an aperture defined by two edges, a trigger pivotally mounted on the firearm and having a projection adapted to engage one of the edges, a pawl pivotally mounted on the trigger and having a projection adapted to engage the other edge, a stop, a second projection on the pawl adapted to engage the stop, means for limiting the relative movement of the trigger and pawl, a spring, said sear having a seat for the spring, and a plunger engaged between the spring and the pawl, said pawl and plunger being so constructed and arranged that the plunger may be engaged with the pawl alternatively on either side of a line passing between the pawl pivot point and the seat for the spring.

27. In a firearm, a barrel, a stationary hollow cylindrical gas pressure receiving element, a bracket surrounding the barrel and the element, a pin inserted through the bracket and engaging both the barrel and the element to maintain the parts in assembled relation, means placing the interior of the element in communication with the interior of the barrel, an operating rod, a member on the operating rod having telescoping engagement with the element, and a rearwardly extending arm on the bracket having a portion at least partially encircling the operating rod and serving as a guide therefor.

28. In a firearm, a trigger, a trigger pin forming a pivotal mounting for the trigger, a sear engaging portion of the trigger remote from the pivotal mounting, a sear engaging pawl pivotally mounted on the trigger between the pivotal trigger mounting and the sear engaging portion of the trigger, a member on the pawl engaging the firearm in the region of the pivotal trigger mounting, and spring means engaging the pawl between the member and the point at which the pawl is pivotally mounted on the trigger.

29. In a firearm, the structure described in claim 28, the member on the pawl being engaged with the trigger pin.

30. In a firearm, a receiver, a longitudinal groove in the outer surface of the receiver, a hole communicating between the forward end of the groove and the interior of the receiver, and an elongated rod-like ejector member rigidly secured at the rear end of the groove and extending forwardly in the groove to pass through the hole into the receiver, the forward end of the ejector member being relatively free and adapted to engage the head of a cartridge to be ejected.

31. In a firearm, the structure described in claim 30, a bolt in the receiver, and a groove in the bolt adapted to receive the relatively free end of the ejector member.

32. In a firearm, the structure described in claim 30, and a rear sight on the receiver having a portion adapted to overlie the receiver groove and secure the ejector member therein.

33. In a firearm, a sear, a trigger pivotally mounted on the firearm having a portion remote from the pivotal mounting adapted to engage the sear, a pawl pivotally mounted on the trigger between the trigger pivotal mounting and the sear engaging portion of the trigger, a projection on the pawl adapted to engage the sear, and a resilient connection engaged between the sear and the pawl, said pawl and the connection being so constructed and arranged that the connection may be engaged with the pawl alternatively on either side of a line passing between the pawl pivot point and the point at which the resilient connection bears on the sear.

34. In a firearm, a trigger, a trigger pin forming a pivotal mounting for the trigger, a firing member engaging portion on the trigger remote from the pin, a firing member engaging pawl pivotally mounted on the trigger between the pin and the firing member engaging portion of the trigger, a member on the pawl engaging the firearm in the region of the pivotal trigger mounting, and a resilient connection bearing at one end on a portion of the firearm and at the other end upon the pawl, said pawl and connection being so constructed and arranged that the connection may be engaged with the pawl alternatively on either side of a line passing between the pawl pivot point and the point at which the first mentioned end bears on the firearm.

35. In a firearm the structure described in claim 34, the member on the pawl being engaged with the trigger pin.

JOHN C. GARAND.

---

CERTIFICATE OF CORRECTION.

Patent No. 2,386,205.     October 9, 1945.

JOHN C. GARAND.

It is hereby certified that error appears in the printed specification of the above numbered patent requiring correction as follows: Page 4, first column, line 16, for the word "insufficient" read --sufficient--; and that the said Letters Patent should be read with this correction therein that the same may conform to the record of the case in the Patent Office.

Signed and sealed this 18th day of December, A. D. 1945.

Leslie Frazer
First Assistant Commissioner of Patents.

(Seal)